Feb. 9, 1954 W. ROTH 2,668,662
INTEGRATOR CIRCUIT
Filed Jan. 15, 1946

INVENTOR
WILFRED ROTH

BY

ATTORNEY

Patented Feb. 9, 1954

2,668,662

UNITED STATES PATENT OFFICE 2,668,662

INTEGRATOR CIRCUIT

Wilfred Roth, Cambridge, Mass.

Application January 15, 1946, Serial No. 641,349

5 Claims. (Cl. 235—61)

This invention relates to apparatus for computing the integral of various voltage time functions and more particularly, to the computation of the integral of the voltage time function derived from a performed operation such as range tracking.

Previous methods of accomplishing this integration have been mathematical or mechanical. Both methods were laborious and time consuming.

An object of this invention is to provide a continuous computer for integrating error signals.

Another object of this invention is to provide an electrical means of integrating a voltage time function.

A further object of this invention is to provide an automatic electrical means of integrating a voltage time function.

A still further object of this invention is to provide continuous automatic electrical means of integrating a voltage time function.

Further objects and advantages of this invention, as well as its arrangement and operation will be apparent from the following description and claims in connection with the accompanying drawings, in which:

Figure 1:
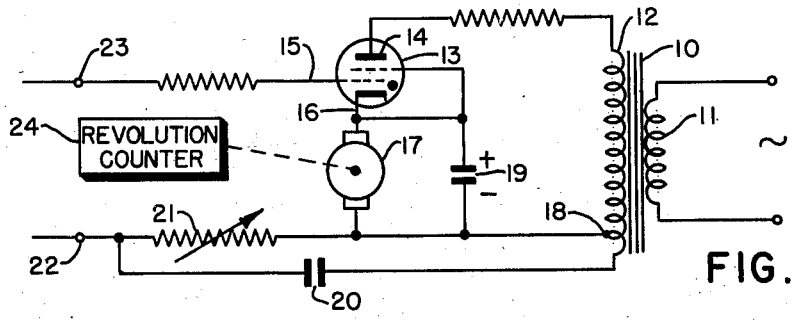
Fig. 1 is a circuit diagram illustrating apparatus for continuously, automatically, electrically integrating an error signal.

Referring to the drawings, Fig. 1 illustrates a circuit diagram providing for the integration of an error signal. An input transformer 10 having primary and secondary windings 11 and 12, respectively, is shown electrically connected to the anode 14 of the thyratron gas tube 13. The cathode 16 of this thyratron tube is connected to one input terminal of a permanent magnet direct current motor 17. The other input lead of the motor 17 is connected to a tap 18 on the secondary 12 of the aforementioned transformer 10. A large condenser 19 (90 microfarads or larger) is connected in parallel with the armature of motor 17. Across the low voltage taps of the secondary winding 12 are connected the condenser 20 and the potentiometer 21. It is obvious therefore, that the bias voltage developed across the potentiometer 21 is applied to the grid-cathode circuit of the thyratron tube 13 through the error signal source which is connected into the system at terminals 22 and 23. The mechanical revolution counter 24 is connected to the output of the motor 17. As a preliminary adjustment terminals 22 and 23 are connected to an error signal source which is not producing any signal. Potentiometer 21 is then adjusted so that the bias on the grid 15 of the thyratron tube 13 is some prearranged standard value.

Figure 3:
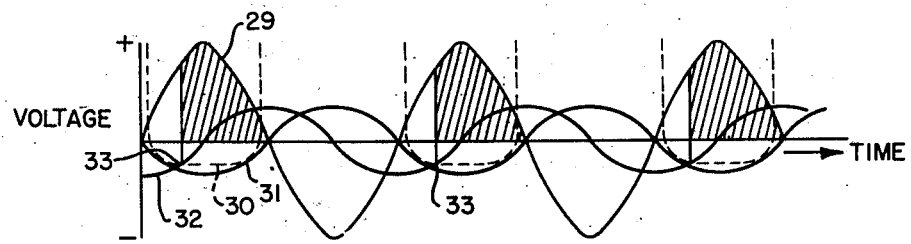
Fig. 3 is a series of wave forms pertaining to the operation of a thyratron gas tube.
Figure 4:
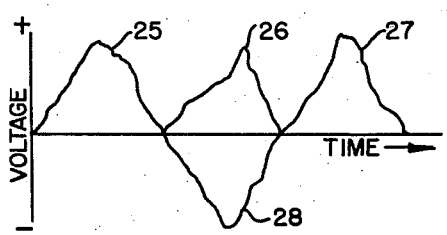
Fig. 4 is a representation of the types of error signals which the invention will integrate; and, Fig. 5 is a wave form of an amplitude modulated wave.

Referring to Fig. 3 for the theory of operation of a thyratron tube, curve 29 represents the anode voltage. The dotted curves 30 are known as the critical grid potential. In other words, if the grid is kept below the value of curve 30 as in curve 31, the thyratron will not conduct. It is obvious that the thyratron will never conduct on the half cycle when its anode potential is negative. Adjustment of the potentiometer 21 results in a shift in phase of the voltage of curve 31 to any value back to that represented by curve 32. Shifting the phase of the bias voltage from curve 31 to that curve 32 brings the bias potential to a value which crosses the critical grid potential curve 30 at the point 33, the thyratron fires and conducts for the time indicated by the cross hatched areas. This conduction results in a pulsating direct current to flow through motor 17 causing it to rotate. These repetitive current pulses, occurring every positive half cycle of the supply voltage causes the motor 17 to run at some average speed. The condenser 19 functions to smooth out the pulsing current and keep the motor operating at a constant speed. Since the revolution counter 24 is connected to the motor, it will register a definite number of revolutions in each unit time. If now an error signal such as that represented by curves 25, 26 and 27 of Fig. 4 is applied from the error signal source to the grid 15 of the thyratron 13, the critical grid potential curve 30 of Fig. 3 may be exceeded sooner in the cycle causing the thyratron to conduct sooner in cycle thus causing current to flow through the motor for a longer period of time and hence increases its speed. During the half cycle when the plate of the thyratron is negative, the cathode potential of the thyratron is determined by the counter electromotive force of the motor 17, which is proportional to its speed. Thus the error signal may be larger or smaller than the cathode potential and the thyratron may or may not fire on the next half cycle of positive anode voltage since it is the voltage difference between grid 15 and cathode 17 of thyratron 13 which determines whether or not the tube will fire. If the motor speed is low, the grid will be positive with respect to the cathode and the tube will fire and increase the motor speed. If the motor speed is high, the grid will be negative with respect to the cathode and the tube will not fire, thus the motor speed will reduce. Since the revolution counter is connected to the motor, the increase in revolutions per unit time over the revolutions per unit time for zero error signal is proportional to the integral of the positive voltage fed to the grid 15 of the thyratron 13.

Figure 2:
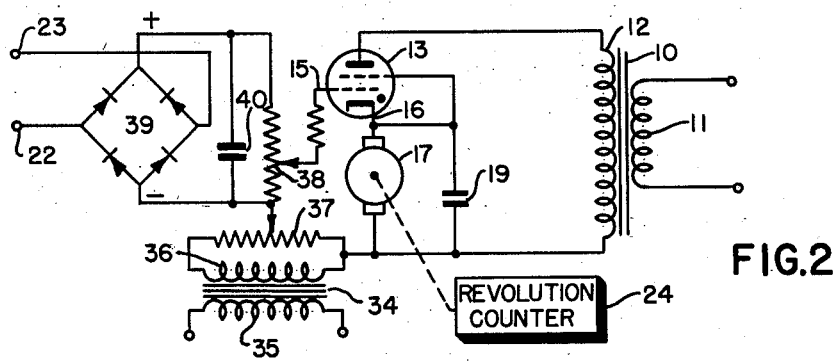
Fig. 2 illustrates another circuit embodying the principles of the invention disclosed in Fig. 1.
Figure 5:
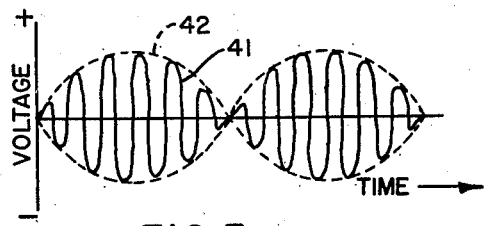

Fig. 2 illustrates a modified form of the circuit of Fig. 1 in which input transformer 10, thyratron 13, motor 17, and revolution counter 24 are all common to those of Fig. 1. In Fig. 2 step down transformer 34, having primary and secondary windings 35 and 36, respectively, is shown connected to the bias potentiometer 37. Potentiometer 37 is shown connected to the grid 15 of the thyratron 13 through the sensitivity control potentiometer 38 and to the cathode 16 of thyratron 13 through the motor 17. In this circuit, the thyratron bias is controlled by adjusting the potentiometer 37 which, in this case, varies the amplitude of the bias voltage instead of the phase. The phase relationship of the bias voltage and the plate voltage is obtained by the relative connections of the transformers 10 and 34 to the source, and this bias relationship is 180 degrees out of phase. The error signal voltage again is connected to terminals 22 and 23, thence to sensitivity control potentiometer 38 through the bridge rectifier 39. Rectifier 39 allows the error signal to be integrated even though it is an alternating potential as shown in curves 25, 26, and 27 of Fig. 4, since the signal will be rectified and will appear as a direct potential, as shown in curves 25, 26 and 27 of Fig. 4, across the sensitivity potentiometer 38. The full wave rectifier 39, likewise will detect modulation envelopes of various alternating voltages such as the one shown in Fig. 5, as well as those alternating potentials described.

If the error signal is some such modulated voltage time function, the condenser 40 serves to by-pass the carrier signal 41 so that the modulation envelope 42 appears across the sensitivity control potentiometer 38. The integration process of Fig. 2 is identical to that described above for Fig. 1.

It is seen, therefore, that this equipment will integrate a voltage time function whose frequency may be any value down to and including zero. The accuracy of these integrations is well within two per cent.

I claim:

1. In a system for continuously computing the integral of a positive voltage time function comprising, a source of alternating voltage, a transformer whose primary is connected to said source of alternating voltage, a thyratron gas tube whose plate is connected to the secondary of said transformer, a permanent magnet direct current motor whose input is connected to the cathode of said thyratron tube and to the secondary of said transformer, an input circuit for introducing said voltage time function connected to the grid and cathode circuits of said thyratron tube, a condenser-potentiometer phase shift bias network connected into said input circuit, and a mechanical revolution counter whose input is connected mechanically to the output of said motor for indicating the computed integral.

2. In a system for continuously computing the integral of any voltage time function comprising, a source of alternating voltage, a voltage step-up transformer whose primary is connected to said voltage source, a thyratron gas tube whose plate is connected to the secondary of said step-up transformer, a permanent magnet direct current motor whose input is connected to the cathode of said thyratron gas tube and to the secondary of said step-up transformer, a step-down transformer whose primary is connected to said source of alternating voltage, a potentiometer bias control connected across the secondary of said step-down transformer, an input circuit for introducing said voltage time function connected into the grid and cathode circuits of said thyratron, a vacuum tube connected as a full wave bridge rectifier in series with the input circuit, and a mechanical revolution counter whose input is mechanically coupled to the output of said motor for indicating the computed integral.

3. Apparatus for computing the integral of an alternating signal voltage, comprising a thyratron gas tube having at least an anode, a cathode and a grid, an alternating voltage source, a transformer having primary and secondary windings, said primary winding being energized from said alternating voltage source, a rheostat and a condenser in series with a portion of said secondary winding adjacent one end thereof, a permanent magnet field direct current motor having one armature terminal thereof connected to said cathode, the other armature terminal thereof being connected to the junction of said rheostat and said portion of said secondary winding, a capacitor connected between said two armature terminals, said anode being connected to the other end of said secondary winding whereby said motor is driven at a predetermined average speed dependent upon the setting of said rheostat, means for applying said alternating signal voltage between said grid and the junction of said rheostat and said condenser, and a revolution counter mechanically driven by said motor, said alternating signal when applied to said grid causing changes in the average speed of said motor and in the number of revolutions registered by said counter per unit time, said changes being proportional to the integral of said alternating signal voltage.

4. Apparatus for computing the integral of an alternating signal voltage, comprising a thyratron gas tube having at least a cathode, an anode and a grid, a direct current motor electrically connected to said cathode, an alternating voltage source for energizing said anode, a variable phase-shifting circuit connected between said alternating voltage source and said grid to provide bias voltage thereto differing in phase from the voltage supplied to said anode, means for adjusting said phase-shifting circuit to cause said motor to run at a predetermined speed, a revolution counter mechanically attached to said motor for recording revolutions thereof per unit time, and means for applying said alternating signal voltage to said grid to vary the speed of said motor and the revolutions per unit time registered by said counter, said variation of revolutions per unit time providing an indication of the integral of said alternating signal voltage.

5. Apparatus for computing the integral of an alternating signal voltage, comprising a thyratron gas tube having at least a cathode, an anode and a grid, a first alternating voltage source having one terminal thereof connected to said anode, a direct current motor connected between said cathode and a second terminal of said first alternating voltage source, a capacitor connected in shunt with said direct current motor, a second alternating voltage source for energizing said grid, said first and second alternating voltage sources being 180° out of phase, a voltage divider connected across said second alternating voltage source, a potentiometer having one end thereof connected to a tap on said voltage divider and a tap connected to said grid, and means for applying said alternating signal voltage to said grid, said means including a bridge rectifier across which said alternating signal voltage is applied, a condenser for by-passing high frequency components in the output of said bridge rectifier, said output being applied across said potentiometer, whereby said alternating signal when applied to said bridge rectifier changes the bias on the said grid causing changes in the speed of said motor and in the number of revolutions registered by said counter per unit time, said changes being proportional to the integral of said alternating signal voltage.

WILFRED ROTH.

References Cited in the file of this patent

UNITED STATES PATENTS

| Number | Name | Date |
|---|---|---|
| 1,772,091 | Stein | Aug. 5, 1930 |
| 2,017,703 | Pratt | Oct. 15, 1935 |
| 2,139,474 | Shepard | Dec. 6, 1938 |
| 2,228,883 | Morgan | Jan. 14, 1941 |
| 2,264,333 | Satterlee | Dec. 2, 1941 |
| 2,309,560 | Welty | Jan. 26, 1943 |
| 2,422,147 | Tornquist | June 10, 1947 |
| 2,512,377 | Pettibone | June 20, 1950 |